United States Patent [19]
Norcross et al.

[11] 3,715,559
[45] Feb. 6, 1973

[54] VERTICAL WELDING MACHINE HAVING SWINGING EQUIPMENT HEAD

[75] Inventors: James E. Norcross, Media, Pa.; George Garwood, Philadelphia, Pa.

[73] Assignee: Arcos Corporation, Philadelphia, Pa.

[22] Filed: April 10, 1972

[21] Appl. No.: 242,360

[52] U.S. Cl.....................................219/126, 219/73
[51] Int. Cl............................B23k 9/12, B23k 9/18
[58] Field of Search................................219/73, 126

[56] References Cited

UNITED STATES PATENTS

| | | | |
|---|---|---|---|
| 1,947,300 | 2/1934 | Mayoh | 219/126 |
| 3,466,421 | 9/1969 | Belfor et al. | 219/73 X |
| 3,666,158 | 5/1972 | Bicker et al. | 219/126 |

*Primary Examiner*—J. V. Truhe
*Assistant Examiner*—Hugh D. Jaeger
*Attorney*—Joseph Gray Jackson et al.

[57] ABSTRACT

A vertical welding machine for welding the vertical weld groove between two plates or the like, having a vertically moving carriage which has a vertical pivot on which a swinging equipment head is positioned which supports the adjoining weld shoe, the snorkel and possibly also other equipment. In a vertical welding machine which has a carriage having outboard pressure support for the weld shoe remote from the vertical axis of its column, the machine may have roller support for the carriage on the opposite side of the vertical column to offset the deflection or distortion which may be caused by the pressure on the shoe.

4 Claims, 6 Drawing Figures

VERTICAL WELDING MACHINE HAVING SWINGING EQUIPMENT HEAD

The invention concerns vertical welding machines which are adapted to make vertical welds in the weld groove between vertical plates and the like. The invention finds its best application in such machines in which the support for the backing plate is independent of the support for the front weld shoe.

A purpose of the invention is to mount the weld shoe and also the snorkel on a vertical pivot on the vertically moving carriage by an equipment head which supports this mechanism and makes it quickly swingable to a position at which the inspection or repair of the weld is possible and also the adjustment and replacement of the shoe and/or the snorkel is possible.

A further purpose is to make the welding shoe and the snorkel accessible for inspection and also the previous weld, in a matter of seconds or minutes, instead of requiring the disassembly of the machine and possibly the destruction of adjustments which are valuable.

A further purpose is to provide an outboard anchorage for the carriage on the side remote from the weld shoe with respect to the column, so that possible distortion or bias of the carriage by the pressure of the shoe can be counteracted.

A further purpose in electroslag or electrogas welding equipment is to make the inspection of the weld possible with a minimum of effort and delay.

A further purpose is to make it possible to obtain quick access to the weld and also the shoe and the snorkel.

Further purposes appear in the specification and in the claims.

In the prior art in making vertical seams welded between vertical plates and the like it has been customary to use a vertically moving carriage or the like on a standard or column, the carriage being relatively immovable except for its up and down motion, and to mount the welding shoes by a bracket from the carriage which supports the welding shoes both on the side adjoining the carriage and also the backing plate or reverse shoe suitably through a cantilever arm extending through the open seam above the weld.

In the present invention we have improved the pre-existing welding machines for making vertical welds between plates and the like. In our machine the shoes and other equipment pertinent to completing the weld on the face near the observer are completely separate from the backup mechanism, which is an independent device. We mount on the carriage a vertically hinged equipment head by a quick disconnect connection, so that the carriage can be swung outwardly for inspection of the weld or repairs and access to the shoe, the snorkel and the appurtenant mechanism.

By this modification and improvement of the pre-existing equipment the matter of gaining access to the front face of the weld is a matter of seconds, whereas previously it required disassembly, possibly consuming several hours. It must be recognized that this problem is complicated by the fact that the shoe may stick in the weld and no longer be readily vertically movable and in the present invention it is very readily retractable out of the way to inspect the condition which has caused the sticking.

In the drawings we show a diagrammatic illustration of the device of the invention, and then a more detailed illustration of the preferred embodiment.

Figure 1:
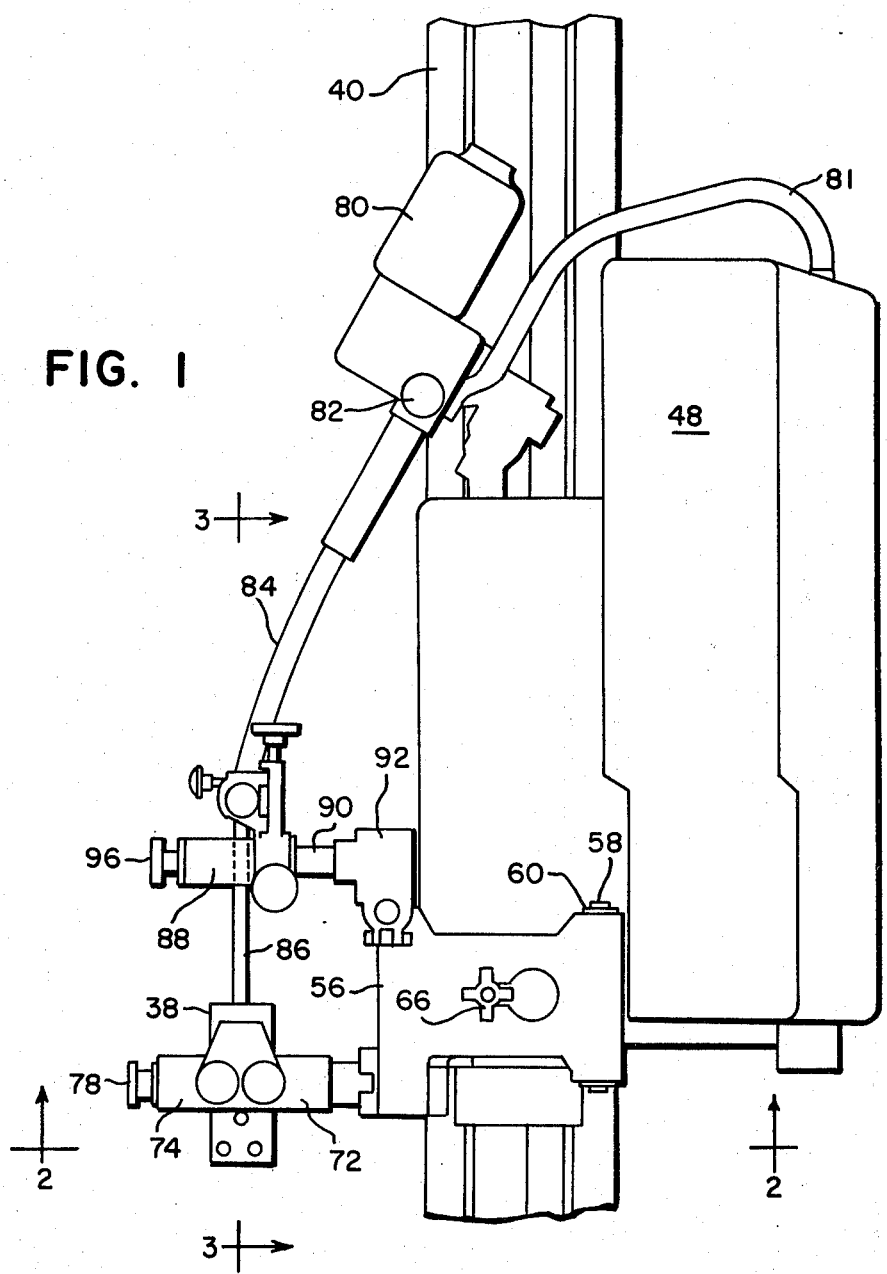
FIG. 1 is a front elevation of the device of the invention broken away at the top and the bottom and showing the movable carriage, the supports for the shoe and the snorkel, and the hinged equipment head. In this view many of the details have been omitted for simplification in illustration.
Figure 2:
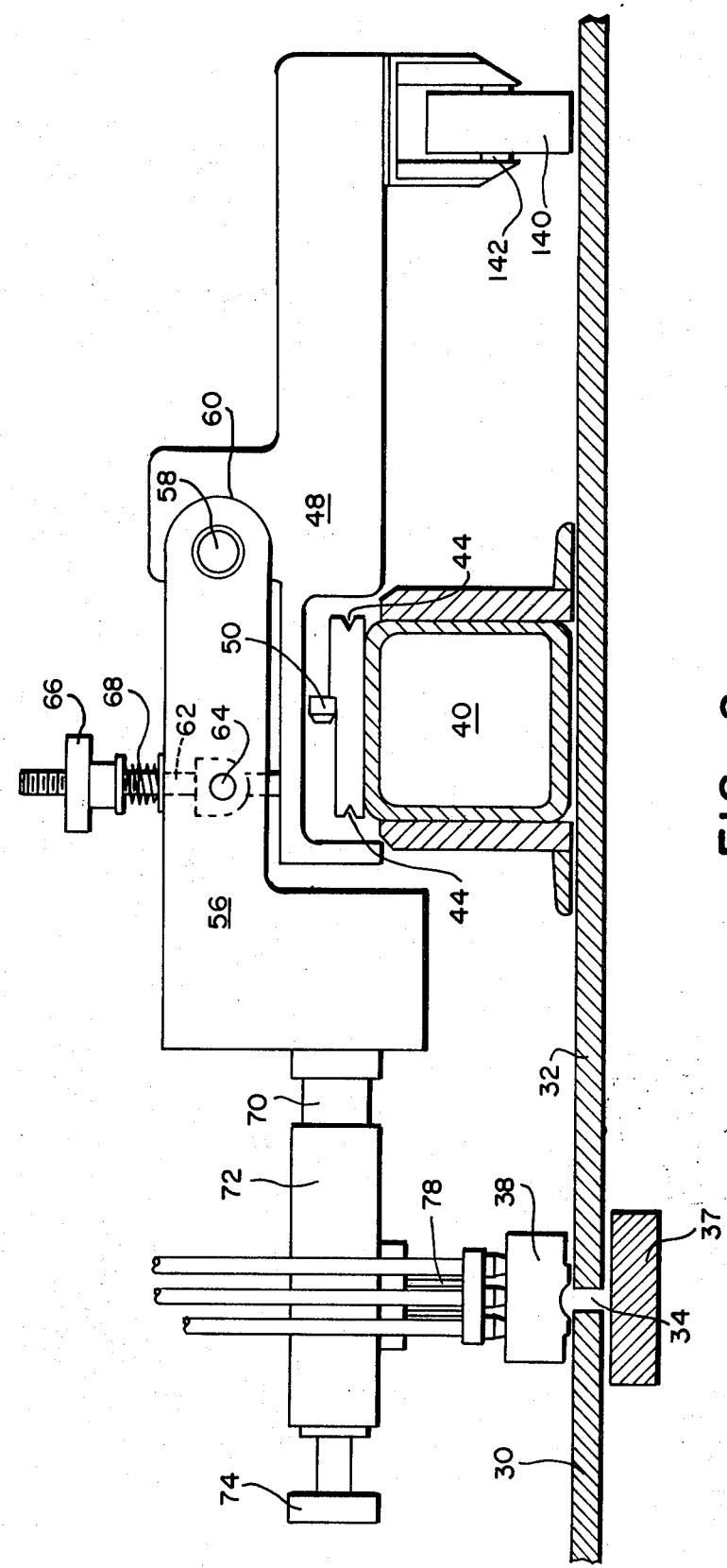
FIG. 2 is a horizontal section looking up on the line 2—2 of FIG. 1.
Figure 3:
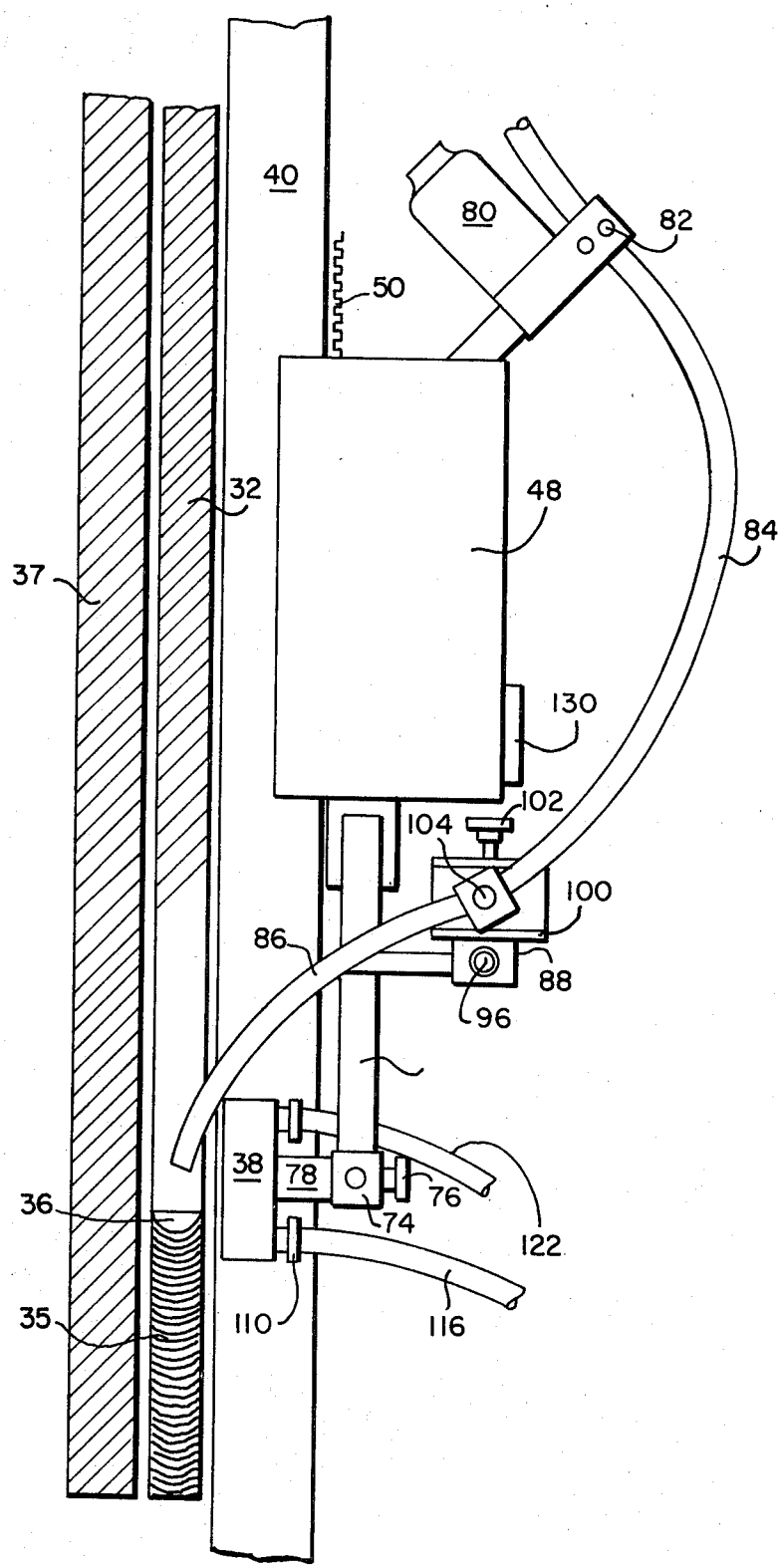
FIG. 3 is a vertical section of FIG. 1 on the line 3—3, schematically done.
Figure 6:
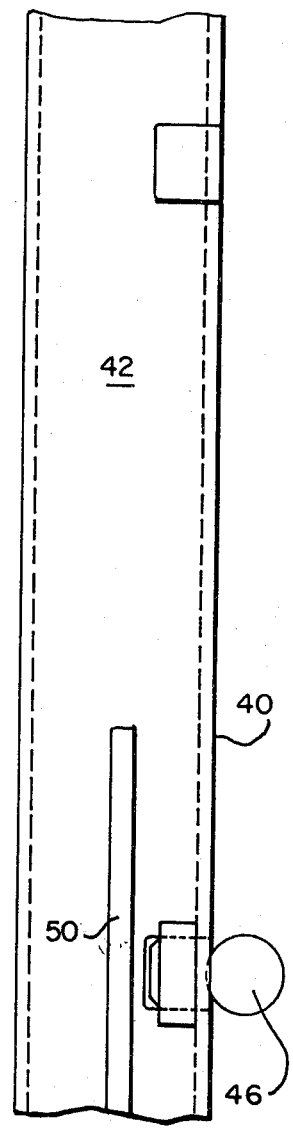
FIG. 6 is a front elevation of the column and the roller assembly showing details not spelled out in FIG. 4.
Figure 4:
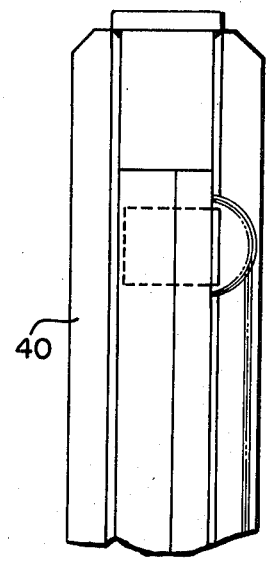
FIG. 4 is a partially broken away front elevation corresponding to FIG. 1 but showing many details of the equipment which are omitted in FIG. 1.
Figure 4:
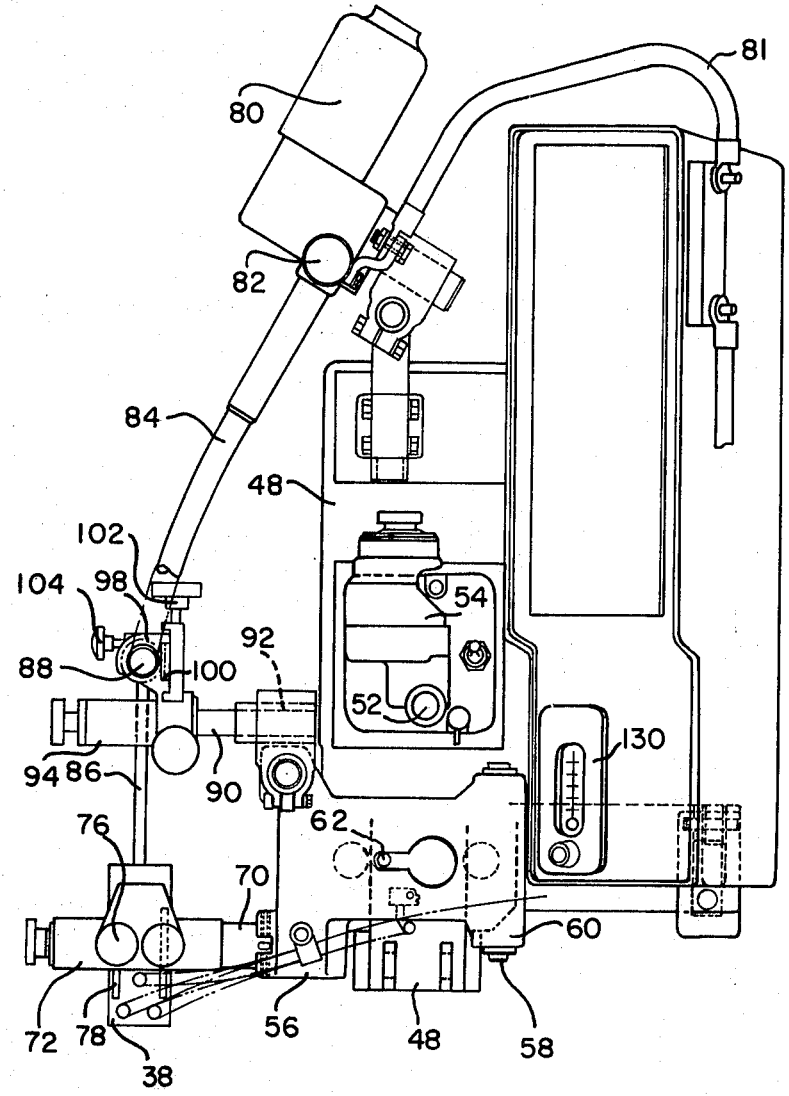

The invention contemplates making a vertical weld between plates 30 and 32 to join the plates at a weld groove 34 producing a weld 35. The invention contemplates retaining a pool 36 of metal and slag between a backing bar 37, whose details are remote from the present invention and which is kept in proper position by customary mechanism not shown, and a front shoe 38. Depending on the method of welding, the backing bar 37 and the shoe 38 may retain a pool of molten slag which is heated by a flow of electric current from the electrode to the molten metal pool, the weld and the plates, or it may contemplate flux cored wire welding of the MIG type having a gas atmosphere to prevent contamination.

The shoe and the welding equipment are ultimately supported by a vertical column, standard or guide 40 which is supported by means not shown in a vertical position in front of the weld. The standard or column 40 has a guiding surface 42 side grooves 44 engaged by rollers 46 on a carriage 48. Supported on the column is a rack 50 engaged by a pinion (not shown) on shaft 52 driven by a motor and speed reducer 54 on the carriage 48. The dead weight of the carriage is preferably reduced to a nominal amount by a counterweight not shown.

The welding current is fed to the snorkel through cable 81.

Figure 5:
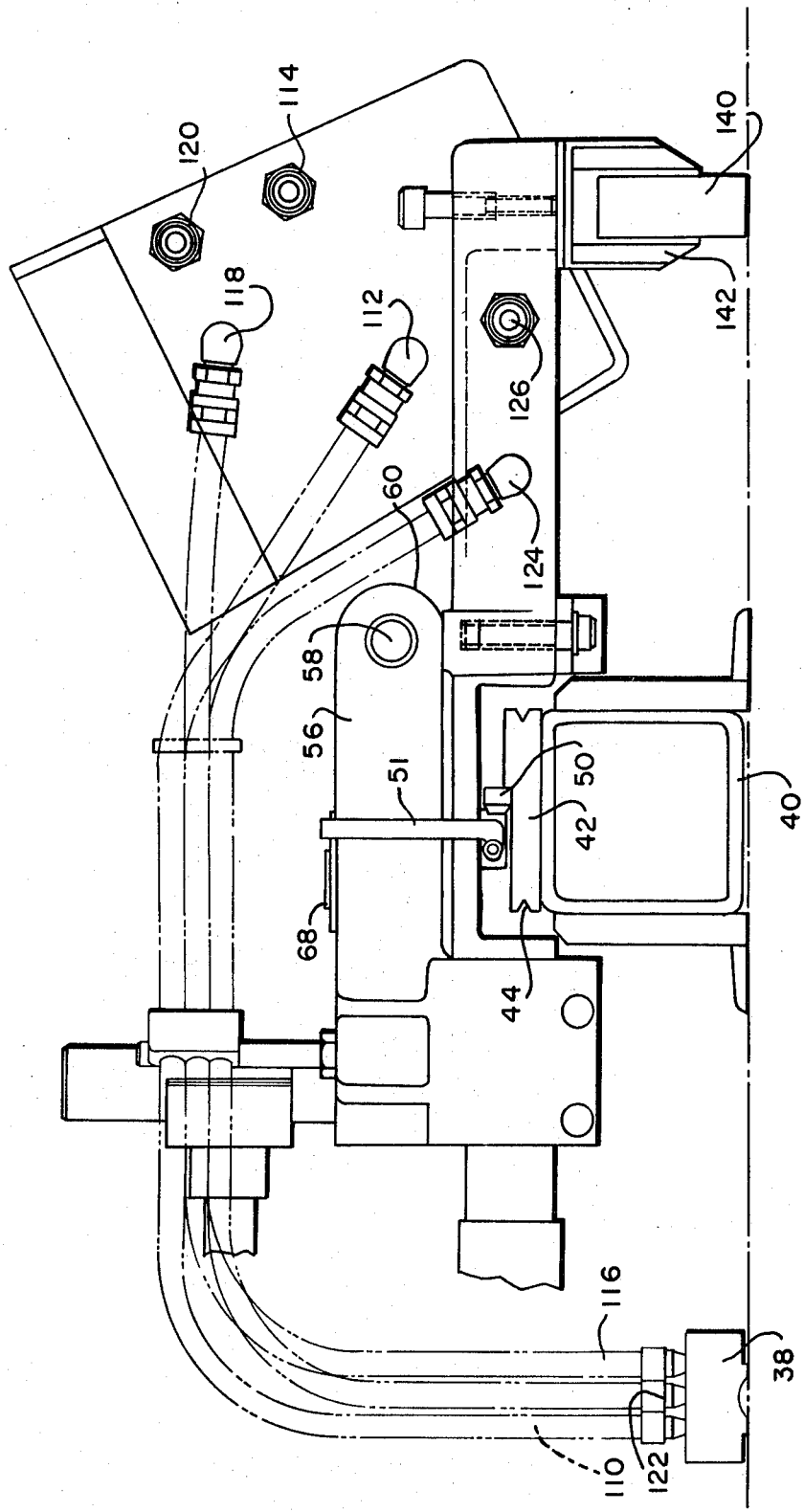
FIG. 5 is a section corresponding to FIG. 2 but containing many of the details omitted from FIG. 2.

Safety device 51, of well known type, shown only in FIG. 5, can if desired be used to prevent any possibility of uncontrolled descent.

On the carriage 48 is supported a swingout equipment head 56 which is supported on a vertical pivot pin 58 supported on a yoke 60 from the carriage so that the equipment head 56 can either be in its normal operative position in which it supports the shoe, the snorkel or wire guide and the adjustments for locating them, or it can be swung out at right angles to its normal position by releasing a quick release latch bolt 62 pivoted on a pivot 64 locked by a nut 66 and tensioned by a spring 68.

The hinged equipment head 56 supports thereon the shoe 38 supported by shaft 70 surrounded by sleeve 72 adjustable in and out by adjustments 74. The shoe is also adjustable laterally by adjustments 76 engaging mounting devices 78.

The electrode or wire feed is by motor 80 driving wire feed 82 supported on the carriage through flexible connection 84 to snorkel 86 supported by adjustable bracket 88 on the swingout equipment head 56 which is adjusted in and out on shaft 90 supported from bracket 92 and having a housing or tube 94 surrounding the shaft and adjustable left and right by adjustment knob 96. This mechanism supports a bracket 98 having an adjustment on slide 100 by adjustment knob 102 for in and out motion and having an adjustment for yaw by knob 104 as well known.

The shoe has water connections 110 in coming from connection 112 through connection 114. The output water flows through flexible hose 116 through hose connection 118 to hose connection 120. Gas in case it is needed is brought in through hose connection 122 from connection 124 emanating from connection 126. The controls such as a flow meter and the like are shown at 130 supported on the carriage.

It will be evident that in the device of the invention considerable pressure may be exerted by the shoe against the plates, and one feature of the invention that is very desirable is that on the outboard side of the carriage remote from the shoe, there is located a castor 140 supported on a bearing 142 from the carriage and engaging the weld plate to offset any tendency to displace the carriage by torque or by vibration.

It will be evident that by the invention the adjacent shoe, and also the snorkel and the gas and water connections, are made accessible by swinging the entire equipment head 56 out at right angles to its normal position and more importantly still, making the previous weld surface accessible for inspection, for repair as by grinding, and for adjustment if the shoe is not positioned correctly.

It will be evident that spring 68 incorporated in the hinge locking mechanism acts as a pressure relief device which allows the equipment head to adjust to unevenness in the plate.

Also, it is possible to inspect the face of the shoe, and, in case it is damaged beyond repair, to replace it, and also to inspect the quality of the weld and adjust the weld variables if they require adjustment. Similarly, the snorkel is very easily inspected and if necessary, adjusted or replaced.

It will be evident that in some cases, especially when a bad runout has just occurred, it is undesirable to delay to solidify the weld and the device can be backed off around the hinge pivot 58 by loosening the quick release nut 66. In other cases it may be desirable to let the weld solidify at the top before backing off the head 56.

Accordingly, the invention makes possible many features of adjustment which were not previously recognized as important and which were not possible on the previous equipment, with a marked saving in time, and a marked potential saving in quality since superior inspection techniques are possible.

In view of our invention and disclosure, variations and modifications to meet individual whim or particular need will doubtless become evident to others skilled in the art, to obtain all or part of the benefits of our invention without copying the apparatus and method shown, and we therefore claim all such insofar as they fall within the reasonable spirit and scope of our claims.

Having thus described our invention, what we claim as new and desire to secure by Letters Patent is:

1. In a vertical welding mechanism for welding a vertical weld groove interposed between vertical plates comprising a vertical column, a carriage on the vertical column and guided for vertical motion, means for moving the carriage vertically as required by the weld, a vertical pivot on the carriage, an equipment head hinged on the vertical pivot, means for securing the equipment head in its normal position and for permitting it to swing out to an inspection position, means for adjustably mounting a shoe on the equipment head to close the edge of the weld groove adjoining the welding mechanism, a snorkel supporting a welding electrode, and means for adjustably supporting the snorkel on the equipment head, whereby by detaching the equipment head, the shoe, and the snorkel can swing into inoperative position permitting inspection of the weld.

2. A mechanism of claim 1, in combination with flexible hose connections on the carriage, which are connected to the shoe and which permit the shoe to move with the equipment support when it is moved into inspection position.

3. A mechanism of claim 1, in combination with an electrode wire feed supported on the carriage and flexible means for connecting the electrode from the electrode wire feed to the snorkel.

4. A mechanism for vertical welding of a weld groove between vertical plates, which comprises a vertical column, a carriage for vertical motion on the column, means for guiding the carriage with respect to the column, means for moving the carriage up and down with respect to the column, a support for a weld shoe ultimately from the carriage on one side of the column, and a roller engaging the weld plate on the opposite side of the column from the weld shoe and counteracting any tendency to displace the carriage by the pressure exerted on the shoe by the weld plate.

* * * * *